UNITED STATES PATENT OFFICE.

LORENZ ACH, OF MANNHEIM, GERMANY, ASSIGNOR TO C. F. BOEHRINGER & SOEHNE, OF MANNHEIM-WALDHOF, GERMANY, A FIRM.

ESTERS OF DIGLYCOLLIC ACID AND PREPARATION OF SAME.

948,084. Specification of Letters Patent. Patented Feb. 1, 1910.

No Drawing. Application filed July 27, 1909. Serial No. 509,795.

*To all whom it may concern:*

Be it known that I, Lorenz Ach, citizen of the German Empire, residing at Mannheim, Germany, have invented certain new and useful Improvements in Esters of Diglycollic Acid and Method of Preparing Same; and I do hereby declare the following to be a full, clear, and exact description of the invention, such as will enable others skilled in the art to which it appertains to make and use the same.

This invention relates to the art of preparing esters of diglycollic acid. I have found that phenyl-esters of diglycollic acid, may be prepared if a di-halogen compound of diglycollic acid is caused to react on the corresponding phenol, or a salt of the same, in the presence of a halogen hydrid binding agents such as dimethyl-anilin. As an example, the compound obtained in this way from phenol and chlorid of diglycollic acid has the composition represented in the structural formula:

$$O\begin{cases}CH_2.COO.C_6H_5\\CH_2.COO.C_6H_5\end{cases}$$

Similar compounds may in this way be obtained also from the dihalogen compounds of diglycollic-acid and phenol derivatives such, for example, as nitrophenols, halogen-phenols and phenol carbonic acids. The compounds so prepared possess valuable therapeutic properties and are to be used as medicines.

To illustrate the invention I will give the following examples which embody the preferred manner of carrying out said invention.

1. *Guaiacol ester of diglycollic acid.*—Preparation of diglycollic acid guaiacol ester:

124 parts by weight of guaiacol are dissolved in 121 parts by weight of dimethylanilin and to this solution are added drop by drop 86 parts by weight of diglycollic acid chlorid, the solution being continually stirred and cooled with ice-water. After allowing to stand for some 7 hours at ordinary temperature the theoretical amount of diluted hydrochloric acid is added, the whole well mixed and the precipitate filtered by suction. The latter precipitate is then recrystallized from benzene or methyl alcohol.

Yield 86%. Melting point of the product 82° C. Colorless needles, readily soluble in ether, alcohol, methyl alcohol, benzene, chloroform; very readily in acetone; very sparingly soluble in water; sparingly soluble in ligroin. Stable in the presence of acids. Alkalies produce saponification. The addition of hydrochloric acid in this process is made for the reason that the dimethyl-anilin-chlorhydrate which is formed by the action of the liberated hydrochloric acid is readily decomposed in a neutral aqueous solution, so that the base dimethyl-anilin would be liberated in part. In order to maintain this dimethyl-anilin in solution, I have found it practicable to add a certain quantity of acid. I have also found that good results are obtained if this quantity is made sufficient to correspond to one molecule of HCl. In the present example this amounts to 365 parts by weight of 10 per cent. hydrochloric acid. The reaction which takes place is indicated in the following equation:

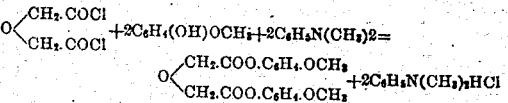

2. *Phenyl ester of diglycollic acid.*—9.4 parts by weight of phenol are dissolved in 53.5 parts by weight of double normal soda lye (sodium hydrate solution) and to this solution, which is maintained cool by water circulation, there are added 8.6 parts by weight of chlorid of diglycollic acid, the whole being thoroughly mixed. The reaction which takes place results in the separation of the new ester and when said reaction is finished the ester is removed by siphon action, decantation or otherwise, and it is then dissolved in methyl-alcohol and crystallized from such solution. The crystals so obtained are in the form of fine white needles having a melting point of 80°, centigrade. Its formula is $C_{16}H_{14}O_5$ and its structural formula:

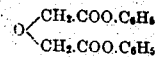

3. *Salicyl-ester of diglycollic acid.*—13.8 grams of salicylic acid are dissolved in 24.2 grams of dimethyl-anilin and the solution is well stirred and cooled by water circulation while adding thereto 8.6 grams of chlorid of diglycollic acid diluted with 20 cubic centimeters of benzol. This mixture will separate in two layers of which the lower one is removed by siphoning or otherwise, whereupon somewhat more than the calculated amount of hydrochloric acid (equivalent to 80 grams of 10% hydrochloric acid) is added thereto, the whole being then well shaken. The precipitate thereby formed is then separated by siphoning off or otherwise removing the liquid. To separate from this precipitate the excess of the more soluble salicylic acid, the same is boiled for a short time with 400 cubic centimeters of water and then immediately filtered while hot. The residue is dissolved in hot alcohol and crystallized therefrom. There are thereby obtained small colorless crystals having a melting point of 173° centigrade. The empiric formula of this new compound is $C_{18}H_{14}O_9$ and its structural formula:

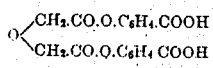

The reaction takes place according to the equation:

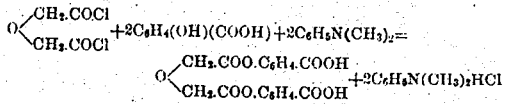

In the above examples, instead of the chlorid of diglycollic acid I may use another dihalogen compound of this acid, such as the bromid or iodid. I have also succeeded in preparing the following esters of diglycollic acid.

1. α-naphthyl-ester, crystallizing, in the form of colorless lamellæ or scales from benzol and having a melting point of 136° centigrade.

2. β-naphthyl-ester, obtained as a white crystalline powder from benzol and having a melting point of 160°, centigrade.

3. Ortho-cresyl-ester crystallizing in the form of fine needles from methyl-alcohol, the melting point being 101°, centigrade.

4. Meta-cresyl-ester, crystallizing in the same way as the last-mentioned compound and having a melting point of 63°, centigrade.

5. Para-cresyl-ester which crystallizes in acicular form from methyl-alcohol and has a melting point of 89° centigrade.

6. Ortho-chlorophenyl-ester, crystallizing in acicular form from alcohol. Melting point 129° centigrade.

7. Para-chlorophenyl-ester, crystallizing in felted needles from alcohol and having a melting point of 130° centigrade.

8. Ortho-nitrophenyl-ester, crystallizing as colorless scales from benzol and having a melting point of 164° centigrade.

9. Para-nitrophenyl-ester, which may be separated in the form of a crystalline powder from benzol and has a melting point of 131° centigrade.

All of the new esters are soluble with great difficulty in water and dilute acids. On heating with aqueous alkali baths these compounds are saponified. The salicyl-ester is saponified even when it is boiled with water.

The following are the special solubilities of the new compounds above referred to: Diglycollic acid phenyl-ester is readily soluble in ether, alcohol, benzol, chloroform and acetone and somewhat soluble in ligroin. Diglycollic acid-salicyl ester is readily soluble in acetone, soluble in alcohol and somewhat soluble in ether, benzol and chloroform. Diglycollic acid-α-naphthyl-ester and diglycollic acid-β-naphthyl-ester are soluble in benzol, chloroform and acetone and somewhat soluble in ether and alcohol. Diglycollic acid-guaiacol-ester is readily soluble in ether, alcohol, benzol, chloroform and acetone and somewhat soluble in ligroin. The ortho-, para- and meta-cresyl-esters of diglycollic acid are readily soluble in acetone and are soluble in ether, alcohol, benzol and chloroform. The ortho- and para-nitrophenyl-esters of diglycollic acid are readily soluble in acetone, soluble in benzol and chloroform, and somewhat soluble in ether and alcohol.

The general structural formula for these compounds is

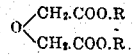

where R designates a radical of the aromatic series, forming part of a phenol or a phenol derivative.

It will be noted that in all cases my invention consists in acting on a phenol compound, such as a phenol or a derivative of a phenol, with a dihalogen derivative or compound of diglycollic acid in the presence of a halogen hydrid binding agent. Such binding agent may be, for example, dimethyl-anilin or an alkali, as above set forth. The diglycollic esters which form the subject-matter of my invention are distinguished from other esters of the corresponding phenols, by their ready decomposition in the animal organism by which they are readily absorbed. They can, therefore, be substituted with advantage for the phenols and their esters which hitherto have been employed in therapy. Their dose is about the same as that of the corresponding carbonates (carbonic acid esters), which have already been employed as medicines.

Having thus fully described my invention, what I claim as new is:—

1. The process which consists in causing a dihalogen compound of diglycollic acid to act on a phenyl-compound in the presence of a halogen hydrid binding agent.

2. The process which consists in causing a dihalogen compound of diglycollic acid to act on a phenol in the presence of a halogen hydrid binding agent.

3. The process which consists in causing a dihalogen compound of diglycollic acid to act on a phenyl-compound in the presence of a hydrochloric acid binding agent while maintaining the mixture cooled.

4. The process which consists in causing a dihalogen compound of diglycollic acid to act on a phenol in the presence of a hydrochloric acid binding agent while maintaining the mixture cooled.

5. As a new chemical compound, an aryl ester of diglycollic acid having the structural formula

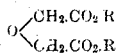

and having the following properties: It is soluble with difficulty in water and dilute acids and saponifies when heated with aqueous alkalies.

6. As a new chemical compound, an aryl ester of diglycollic acid having the structural formula

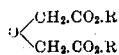

and the following properties: It is soluble with difficulty in water and dilute acids, saponifies when heated with aqueous alkalies, is readily soluble in acetone, is soluble in alcohol, and crystallizes in the form of small white or colorless crystals.

7. As a new chemical compound guaiacol ester of diglycollic acid which has the structural formula.

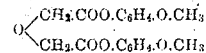

and the following properties: It is soluble with difficulty in water and dilute acids, saponifies when heated with dilute alkalies, is readily soluble in ether, alcohol, benzol, chloroform and acetone, is slightly soluble in ligroin, and crystallizes in the form of colorless needles having a melting point of 80° centigrade.

In testimony whereof I hereunto affix my signature in the presence of two witnesses.

LORENZ ACH.

Witnesses:
SIMON HATHAWAY,
ERNEST L. IVES.